(12) United States Patent
Gyoten et al.

(10) Patent No.: US 7,172,829 B2
(45) Date of Patent: Feb. 6, 2007

(54) FUEL CELL AND PROCESS FOR THE PRODUCTION OF SAME

(75) Inventors: Hisaaki Gyoten, Osaka (JP); Kazuhito Hatoh, Osaka (JP); Shinya Kosako, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 525 days.

(21) Appl. No.: 10/681,334

(22) Filed: Oct. 9, 2003

(65) Prior Publication Data

US 2004/0191600 A1 Sep. 30, 2004

(30) Foreign Application Priority Data

Oct. 10, 2002 (JP) .............................. 2002-297749

(51) Int. Cl.
*H01M 8/10* (2006.01)
*H01M 8/02* (2006.01)

(52) U.S. Cl. .............................. 429/30; 429/32; 429/37

(58) Field of Classification Search ................... 429/30, 429/31, 32, 33, 37
See application file for complete search history.

(56) References Cited

U.S. PATENT DOCUMENTS

| | | | | |
|---|---|---|---|---|
| 6,054,230 | A | | 4/2000 | Kato .............................. 429/33 |
| 6,372,372 | B1 * | | 4/2002 | D'Aleo et al. ............. 429/37 X |
| 6,485,856 | B1 * | | 11/2002 | Brown et al. ................. 429/33 |
| 6,602,630 | B1 * | | 8/2003 | Gopal .......................... 429/30 |
| 6,630,265 | B1 * | | 10/2003 | Taft et al. ..................... 429/33 |
| 2002/0071980 | A1 | | 6/2002 | Tabata et al. ................. 429/30 |

FOREIGN PATENT DOCUMENTS

| | | |
|---|---|---|
| EP | 1063334 | 12/2000 |
| EP | 1085038 | 3/2001 |
| JP | 7135003 | 5/1995 |
| JP | 08-162132 | 6/1996 |
| JP | 08-213027 | 8/1996 |
| JP | 08-329962 | 12/1996 |
| JP | 09-219206 | 8/1997 |
| JP | 11-135135 | 5/1999 |
| JP | 2001-345110 | 12/2001 |

OTHER PUBLICATIONS

Computer-generated English Translation of JP-07-135003 (doc date May 1995).*
* Partial translation of JP '027. (Aug. 1996).
Japanese Office Action dated Jun. 28, 2005 with English translation.
European Search Report dated Nov. 8, 2005.

* cited by examiner

*Primary Examiner*—Stephen J. Kalafut
(74) *Attorney, Agent, or Firm*—Stevens, Davis, Miller & Mosher, LLP

(57) ABSTRACT

A fuel cell component includes an electrolyte membrane and insert members disposed within the electrolyte membrane. The insert members are arranged to provide compression resistance of the assembly of the insert members and electrolyte membrane. Creep resistance of the assembly of the insert members and electrolyte membrane is greater than a creep resistance of the electrolyte membrane alone.

5 Claims, 10 Drawing Sheets

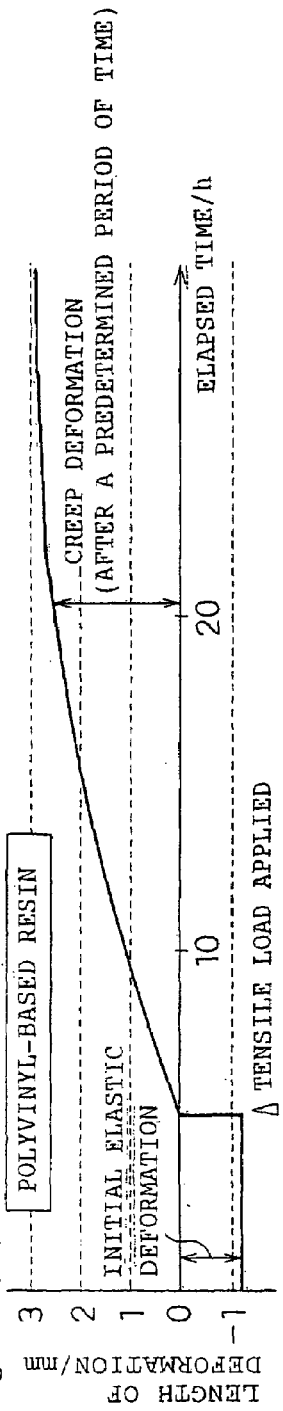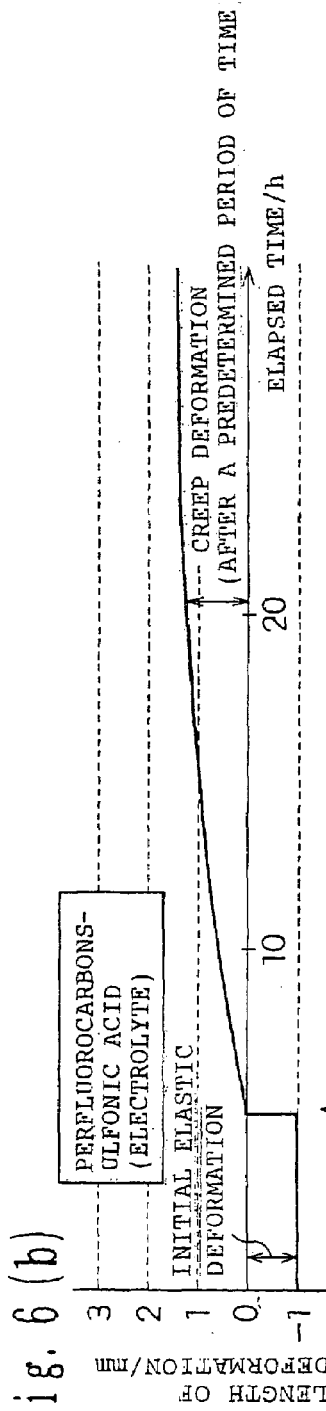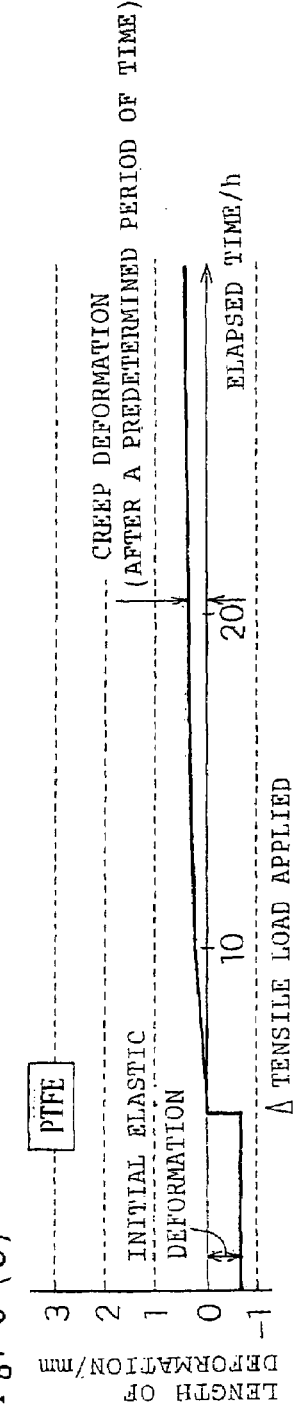

FUEL CELL AND PROCESS FOR THE PRODUCTION OF SAME

BACKGROUND OF THE INVENTION

1. Field of the Invention

The present invention relates to a fuel cell for use in, for example, a portable power supply, a power supply for an electric car, a household co-generation system, and other such devices and systems, and a process for the production thereof.

2. Related Art of the Invention

The basic structure of the related art polymer electrolyte type fuel cell will be described in connection with FIG. 7. FIG. 7 is a longitudinal sectional view illustrating the configuration of the related art polymer electrolyte type fuel cell stack.

A solid polymer electrolyte type fuel cell allows a fuel gas containing hydrogen and an oxidizer gas containing oxygen, such as air, to undergo an electrochemical reaction to generate electricity and heat at the same time. The solid polymer electrolyte type fuel cell of FIG. 7 comprises a polymer electrolyte membrane (PEM) 71, which allows the selective transportation of a hydrogen ion upon the application of an electric field, and a pair of gas diffusion electrodes 72 formed on the respective sides of the polymer electrolyte membrane 71.

Gas diffusion electrode 72 mainly comprises a carbon powder, having a platinum group metal catalyst supported thereon, and comprises (1) a catalyst layer formed in contact with polymer electrolyte membrane 71 and (2) a gas diffusion layer, having both air permeability and electronic conductivity, that is formed on the side of electrode 72 opposing a separator 73. Also, a gasket 74, or gas sealing material, is disposed around gas diffusion electrode 72 as shown to prevent the two supplied gases from leaking or being mixed with each other. Gasket 74 may be pre-assembled integrally with gas diffusion electrode 72 and polymer electrolyte membrane 71 (in a one-piece structure or coupled therewith).

The configuration comprising polymer electrolyte membrane 71 and the electrode 72 is referred to as a membrane-electrode assembly (MEA). In an ordinary polymer electrolyte type fuel cell, the MEA is mechanically fixed and an electrically-conductive separator 73 is provided for electrically connecting adjacent MEAs to each other in series. The lamination of a number of single cells, essentially comprising the MEA and electrically-conductive separator 73, produces a fuel cell stack.

Separator 73 is made of an electrically-conductive and airtight material, having some corrosion resistance, such as a carbon plate and a metal plate. In each of the single cells of the stack, a gas channel for supplying the reactive gas onto the surface of gas diffusion electrode 72 and removing the produced gas or extra gas is formed on the portion of separator 73 in contact with the MEA. Alternatively, the gas channel may be provided on a portion of the stack other than separator 73 such as the surface of gas diffusion electrode 72. However, it is usual that a groove is provided on the surface of separator 73 to form a gas channel.

To supply the reactive gas through the gas channel, a means is required for supplying and distributing the reactive gas into the respective single cells, collecting the residual gas and the gas produced in gas diffusion electrode 72, and discharging these gases to the exterior of the cell. As such means, a hole is formed through the respective single cells to supply the fuel gas and oxidizer gas into the respective single cells and discharge these gases. The hole is referred to as a "manifold."

Manifolds are divided into two types. An internal manifold is a series of communicating through-holes formed by laminating separators 73, each having a through-hole formed therein in the direction of the stack. An external manifold is formed on the side of a laminate of separators 73, as a structure distinct from separator 73.

A fuel cell generates heat during operation and thus is required to be cooled with cooling water, or the like, to keep itself under good temperature conditions. Generally, a cooling portion is interposed between separators 73 to enable cooling water to flow to one to three cells. In most cases, the cooling portion includes a cooling water channel provided on the back of separator 73. The supply of cooling water into the cooling portions and discharge of cooling water therefrom are conducted through the manifold, which is formed through the respective cells. The supply and discharge of the reactive gases are usually conducted through this manifold also.

An ordinary cell stack is obtained by laminating MEAs, separators 73, and cooling portions on each other to form a laminate of from 10 to 200 fuel cells. The stack is clamped between end plates, with a collector and an insulating plate interposed therebetween, and then the stack is fixed with a clamping bolt from both ends thereof.

Hydrogen is used as the fuel for the polymer electrolyte type fuel cell. Hydrogen may be supplied from a hydrogen bottle or may be obtained by converting a hydrocarbon fuel to hydrogen through a modifier. Air may be used as the oxidizer gas.

Since the polymer electrolyte membrane can be provided with a high hydrogen ionic conductivity only when it is hydrous, either the fuel gas or air supplied to the fuel cell is often provided with water vapor. For the supply of such a reactive gas into the fuel cell, a blower or compressor is used.

The electric power produced by the fuel cell is direct current (DC) power, which is better used at a higher voltage to give a higher utility. Accordingly, DC power is converted to alternating current (AC) power, having a higher voltage, by a power converter or inverter.

The electrochemical reaction of hydrogen with oxygen and the resulting generation of electric current are accompanied by the generation of heat. In order to keep the cell temperature constant, the heat thus generated is released to the exterior of the cell or the cell is cooled with a heat medium. The heat which has been withdrawn to the exterior of the fuel cell may be utilized as a hot water supply or used for heating in a household co-generation system.

A fuel cell system comprises a fuel cell such as described above, a modifier, a power management portion, such as a power converter and inverter, a heat utilization element, and a control system for functionally operating these portions.

The particular gas diffusion electrode 72 into which the fuel gas is supplied is referred to as an "anode," and the electrode into which the oxidizer gas, such as air, is supplied is referred to as a "cathode." During the generation of electricity, the anode acts as a negative electrode while the cathode acts as a positive electrode.

On the anode, the supplied hydrogen is oxidized in the vicinity of the catalyst to produce a hydrogen ion, which is then released into the electrolyte. On the cathode, the supplied hydrogen ion from the anode and the oxygen in the oxidizer gas react to produce water.

Accordingly, these gas diffusion electrodes 72 must be highly air-permeable throughout their entireties, so that they can be thoroughly supplied with the reactive gas. The reactive gas is thoroughly supplied onto the surface of the catalyst, which is a reaction site. Additionally, gas diffusion electrode 72 must be highly air-permeable so the water vapor that is produced by the electrochemical reaction and the unreacted carbonate gas, nitrogen, etc., can be readily discharged from the reaction site. Similarly, it is important that these gas diffusion electrodes 72 are arranged such that the hydrogen ion and an electron can be easily supplied into and discharged from the reaction site.

The supplied gas is moistened at a dew point close to the cell temperature, to enhance the hydrogen ionic conductivity of the electrolyte. Therefore, when the gas is consumed at any of the electrodes, the supersaturated water vapor undergoes dew condensation on the interior of the electrodes. The amount of water is greater on the cathode because it also contains water content produced by the electrochemical reaction. The water condensate thus formed is then re-evaporated in the supplied gas or discharged as a water droplet. The water droplet and the discharged gas are discharged into the gas discharge manifold, via the gas supply passage.

As a method of producing the MEA for a polymer electrolyte type fuel cell, there has heretofore been normally employed a method which comprises forming a polymer electrolyte membrane 71 according to an extrusion method, subjecting electrolyte membrane 71 to heat treatment, forming a catalyst layer on both sides of polymer electrolyte membrane 71 according to a printing method, transferring method or the like, and then forming a gas diffusion layer made of carbon paper, carbon cloth or the like on the outer side of the catalyst layer.

In recent years, another production method has been practiced to improve the cell performance and reduce the production cost. This method comprises casting a polymer electrolyte membrane 71 into a sheet with a polymer electrolyte solution, continuously forming an anode-side catalyst layer and a cathode-side catalyst layer on the front and rear sides of the sheet, and then subjecting the combination to heat treatment. To prevent a break of polymer electrolyte membrane 71, the membrane 71 may be provided with pores 21 or the membrane may be provided with a fiber material 22, or similar material, as shown in FIGS. 9 and 10 (see JP-A-8-162132, JP-A-8-213027, JP-A-8-329962, and JP-A-2001-3451100). FIG. 9 is a longitudinal sectional view illustrating a reinforcing arrangement for the MEA, in a related art polymer electrolyte type fuel cell. FIG. 10 is a longitudinal sectional view illustrating another reinforcing structure for the MEA, in a related art polymer electrolyte type fuel cell. The disclosures of JP-A-8-162132, JP-A-8-213027, JP-A-8-329962, and JP-A-2001-3451100 are incorporated herein by reference in their entireties.

In general, a perfluorocarbonsulfonic acid to be used as a polymer electrolyte is formed by a main chain moiety, for securing thermal and electrochemical stability and mechanical strength, and a pendant moiety which takes part in ionic conduction. When the perfluorocarbonsulfonic acid acts as an electrolyte, the pendant moieties gather together to cause hydration of water molecules that form an ionic conduction channel. To keep the ionic conductivity of the polymer electrolyte high, it is necessary that the supplied gas be moistened to keep the polymer electrolyte highly hydrous.

Generally, a polymer electrolyte has properties of a viscoelastic material. In other words, when a predetermined tension (or compressive force} is kept applied to the electrolyte membrane, the initial elastic deformation is followed by plastic deformation, i.e., so-called creep. On the contrary, when a tension (or compressive force) causing a predetermined deformation is kept applied to the electrolyte membrane, the electrolyte membrane undergoes relaxation and tension reduction (or compressive force) with time, i.e., so-called stress relaxation.

A polymer electrolyte type fuel cell comprises a stack of basic configurations, each comprising a polymer electrolyte membrane 71, gas diffusion electrodes 72 with the polymer electrolyte membrane 71 interposed therebetween, and a separator 73. These constituent parts are clamped at a predetermined pressure on both ends of the stack as shown in FIG. 7. Accordingly, a clamp providing a predetermined compressive pressure 75 is always applied to these constituents.

When a compressive pressure acts on polymer electrolyte membrane 71 from separator 73 over an extended period of time, via the catalyst layer and the gas diffusion layer, polymer electrolyte membrane 71 undergoes plastic deformation. Under such condition, because the catalyst layer and the gas diffusion layer each are essentially a porous material and have a complicated surface, part of the polymer electrolyte membrane 71, which has undergone plastic deformation, penetrates the interior of the catalyst layer or the gas diffusion layer. The penetration part is that having a relatively low density or small mechanical strength, as shown in FIG. 8. FIG. 8 is a longitudinal sectional view illustrating the cell in the related art polymer electrolyte type fuel cell stack after a prolonged operation.

Furthermore, when creep proceeds, the reactive gases on the anode and cathode sides eventually mix with each other to cause cross-leak or the anode and the cathode make an electrical contact with each other to cause minute short-circuiting as indicated by the sign X in FIG. 8. The cross-leak or minute short-circuiting not only causes cell performance deterioration, by itself, but also gives a new cause of performance deterioration due to local heat generation or drying or shortage of the reactive gases.

The clamping pressure 75 applied to the stack from both ends is supported by gasket 74 or sealing material arranged around the MEA. The contact pressure applied by separator 73 to the electrolyte membrane 71 via gas diffusion electrode 72 reaches a predetermined value. Then, polymer electrolyte membrane 71, which is a viscoelastic material, undergoes stress relaxation. Thus, the contact pressure decreases with time.

When the contact pressure across the catalyst layer and the gas diffusion layer and across the gas diffusion layer and the separator decrease, as indicated by the sign Y in FIG. 8, the contact resistance of electronic conduction increases. This increased contact resistance increases the electricity generation loss at these sites. As a result, the cell performance deteriorates.

SUMMARY OF THE INVENTION

An object of the present invention is to provide a fuel cell that is less subject to performance deterioration and the destruction caused by a creep or stress relaxation phenomenon in the electrolyte.

Another object of the invention is to provide a process for the production of such a fuel cell.

A further object of the invention is to overcome the aforementioned problems with the related art.

A fuel cell component according to the present invention includes an electrolyte membrane and insert members disposed within the electrolyte membrane. The insert members are arranged to provide compression resistance of the assembly of the insert members and electrolyte membrane. Creep resistance of the assembly of the insert members and electrolyte membrane is greater than a creep resistance of the electrolyte membrane alone. The insert members may have a spherical or any other shape.

According to one embodiment of the present invention, there is provided a fuel cell component comprising an electrolyte membrane and a plurality of insert members disposed in the electrolyte membrane that provide resistance to creep in the electrolyte membrane that would otherwise result from a compression force applied substantially perpendicular to a surface of the electrolyte membrane. The insert members may have a greater creep resistance than that of the electrolyte membrane and a greater mechanical rigidity than that of the electrolyte membrane. The plurality of insert members may have an average outer dimension that is greater than 5 μm and no greater than a thickness of the electrolyte membrane. The electrolyte membrane may comprise a polymer electrolyte and the insert members may be incorporated into the polymer electrolyte membrane in an amount ranging from 1% to 50% by volume. The insert members may be granular members.

The plurality of insert members may comprise PTFE and have an average outer dimension that is greater than 5 μm and no greater than a thickness of the electrolyte membrane. The average outer dimension of the plurality of insert members may be approximately 30 μm. The insert members may comprise glass and have an average outer dimension that is greater than 5 μm and no greater than a thickness of the electrolyte membrane. The insert members may comprise a material made of one of copper, aluminum, titanium, zirconia, aluminum nitride, SiC, and quartz glass. The insert members may comprise a material made of one of titanium, zirconia, aluminum nitride, and quartz glass.

The electrolyte membrane may be produced from a polymer electrolyte solution having an EW value in the range of 900 to 1100. The EW value of the electrolyte membrane may be substantially different from the EW value of the insert members. The EW value of the electrolyte membrane may be substantially the same as the EW value of the insert member. The glass transition temperature of the electrolyte membrane may be substantially different from the glass transition temperature of the insert member.

A structure of the main chain moiety of the insert member may be the same as the main chain moiety of the electrolyte membrane. The plurality of insert members may comprise PTFE, have an average outer dimension in the range of about 5 to 15 μm, and amount to not less than 1% by volume of the electrolyte membrane an insert members in combination. The insert members may provide increased threshold stress of the electrolyte membrane against plastic deformation. The fuel cell component may further comprising a structure applying a compressive load against the electrolyte membrane, wherein the plurality of insert members do not directly support the compressive load. The plurality of insert members may comprise a fine leaf glass powder.

According to another embodiment of the invention, there is provided a fuel cell stack comprising first and second end plate assemblies; a fuel cell assembly interposed between the first and second end plate assemblies and comprising fuel cell components each comprising an electrolyte membrane and a plurality of insert members disposed in the electrolyte membrane that provide resistance to creep in the electrolyte membrane that would otherwise result from a compression force applied substantially perpendicular to a surface of the electrolyte membrane and electrodes disposed on each side of the electrolyte membrane, the fuel cell components being laminated with a plurality of separators, and a compression assembly that clamps the first and second end plate assemblies and the fuel cell assembly together to provide the compression force. The fuel cell according to claim 20, wherein the insert members have a greater creep resistance than the electrolyte membrane. The insert members may comprise granular members. The plurality of granular members may have an average diameter that is approximately less than or equal to a thickness of the electrolyte membrane. The plurality of granular members have an average diameter that is approximately greater than or equal to 5 μm. The insert members may comprise a material made of one of titanium, metal oxide, metal nitride, inorganic glass, and fluororesin. The insert members may comprise a material made of a polymer-compound whose structure of the main chain moiety is the same as that of a material of the electrolyte membrane.

The present invention also provides a process for production of a fuel cell component, the method comprising the steps of arranging a plurality of insert members in an electrolyte membrane to counteract creep that would otherwise result from a compression force applied substantially perpendicular to a surface of the electrolyte membrane.

BRIEF DESCRIPTION OF THE DRAWINGS

FIG. 6(a) illustrates the creep resistance of a polyvinyl-based resin material for incorporation into an electrolyte membrane;

FIG. 6(b) illustrates the creep resistance of a perfluorocarbonsulfonic acid material for incorporation into an electrolyte membrane;

FIG. 6(c) illustrates the creep resistance of a PTFE material for incorporation into an electrolyte membrane;

DESCRIPTION OF REFERENCE NUMERALS IN THE DRAWINGS

1 Polymer electrolyte membrane
2 Gas diffusion electrode and catalyst layer
3 Separator
4 Gasket
5 Clamping force (compressive pressure)
11, 12, 13 Beads
15 Supporting force against clamping force

DETAILED DESCRIPTION

Illustrative embodiments of implementation of the invention will be described hereinafter in connection with the attached drawings.

Figure 1:
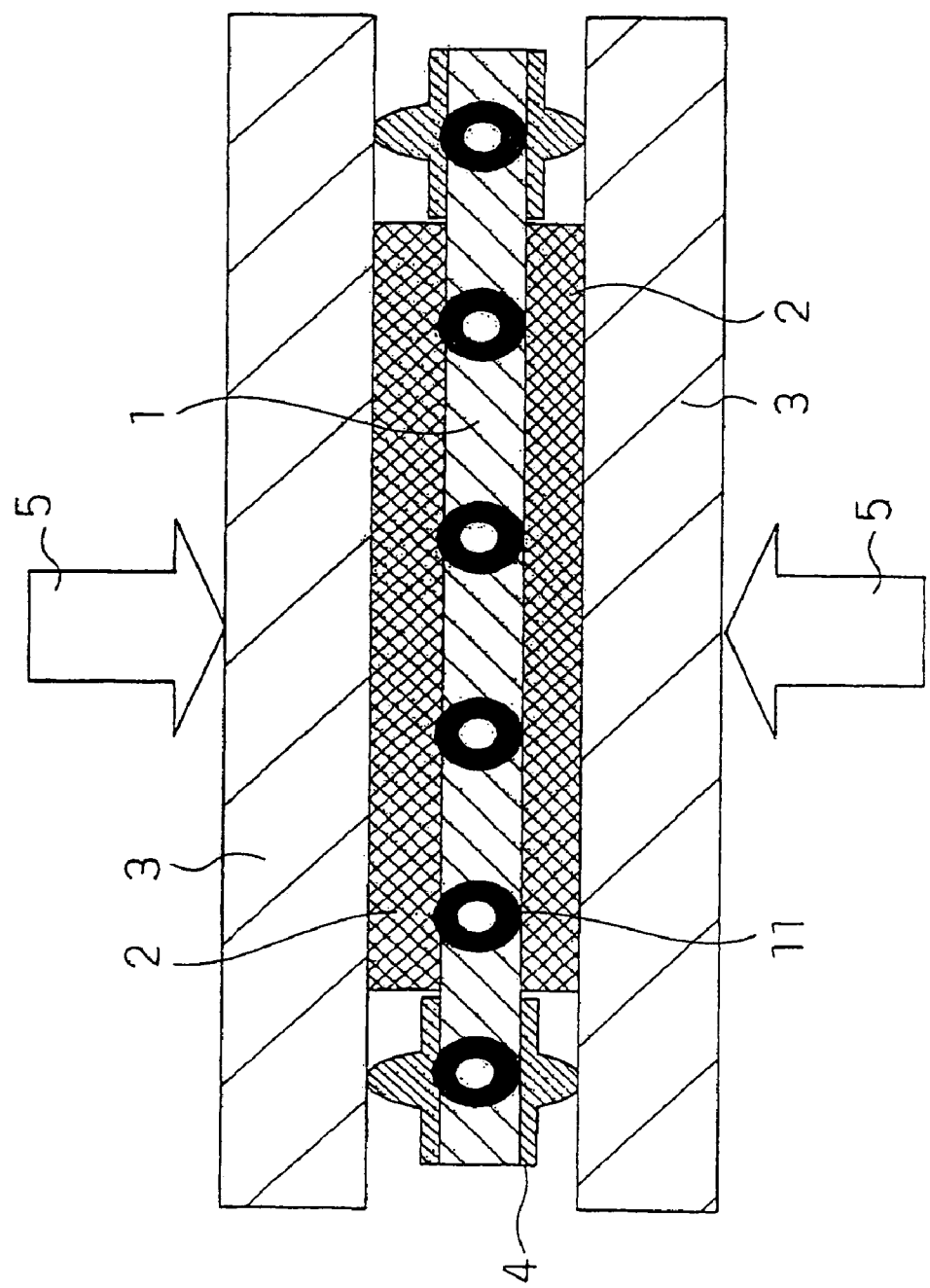
FIG. 1 is a schematic longitudinal sectional view illustrating a configuration of a membrane electrode assembly for a solid polymer electrolyte type fuel cell according to a first embodiment of the invention.

FIG. 1 is a schematic longitudinal sectional view illustrating a configuration of a MEA for a solid polymer electrolyte type fuel cell according to a first embodiment of the invention. The polymer electrolyte type fuel cell is one cell of a fuel cell stack and comprises a membrane-electrode assembly including a polymer electrolyte membrane 1, a pair of gas diffusion electrodes 2 having the polymer electrolyte membrane 1 interposed therebetween, and separators 3 laminated on each side of the membrane-electrode assembly. As indicated by two arrows 5, a clamp is used to apply a clamping pressure to the cell stack. For ease of illustration, one cell of the stack is shown subjected to pressure 5, but it is readily apparent that pressure 5 would be transmitted through the cells in the stack. The MEA's are typically incorporated into a stack like that of FIG. 11.

Polymer electrolyte membrane 1 includes beads 11 incorporated therein that function to support the clamping pressure on the cell stack. Beads 11 are made of a material and structure that has a greater creep resistance than that of the material and structure of electrolyte membrane 1. Beads 11 may be made of a material selected from the group of titanium, metal oxide, metal nitride, inorganic glass material, and fluororesin. Moreover, beads 11 may be made of a polymer electrolyte material different from the material constituting electrolyte membrane 1. Beads 11 have a particle diameter that is greater than 5 μm, on the average, and that is not greater than the thickness of electrolyte membrane 1.

A detailed configuration of the polymer electrolyte type fuel cell according to an embodiment of the present invention will be described hereinafter.

Polymer electrolyte membrane 1 is a hydrous fluorine-based or hydrocarbon-based membrane having a thickness of from 15 μm to 200 μm. Electrolyte membrane 1 is subjected more to creep from stress as the ambient temperature increases or the relative humidity of the coexisting humidifying gas increases. To form electrolyte membrane 1 of a single material in order to prevent deterioration of performance or destruction of the fuel cell due to creep, it would be necessary to select a material having enhanced creep resistance. However, the need to keep the hydrogen ionic conductivity high provides a limitation on the material that may be used for a single material electrolyte membrane.

Therefore, to enhance the creep resistance of the entire electrolyte membrane 1 while maintaining the desired hydrogen ionic conductivity, the embodiments of the present invention include an electrolyte membrane 1 that comprises beads 11 of a material having a relatively higher rigidity and a higher creep resistance than that of the main material of membrane 1. Beads 11 may have zirconia, glass, and fluororesin incorporated therein in addition to being made of a material providing hydrogen ionic conductivity Beads 11 are arranged as shown in FIG. 1 to support the compression force 5 applied to electrolyte membrane 1 via the gas diffusion layer or catalyst layer. In FIG. 1, beads 11 have a high creep resistance and a particle diameter that is substantially the same as the thickness of electrolyte membrane 1. Beads 11 are incorporated in electrolyte membrane 1 and support the compression force 5.

Figure 2:
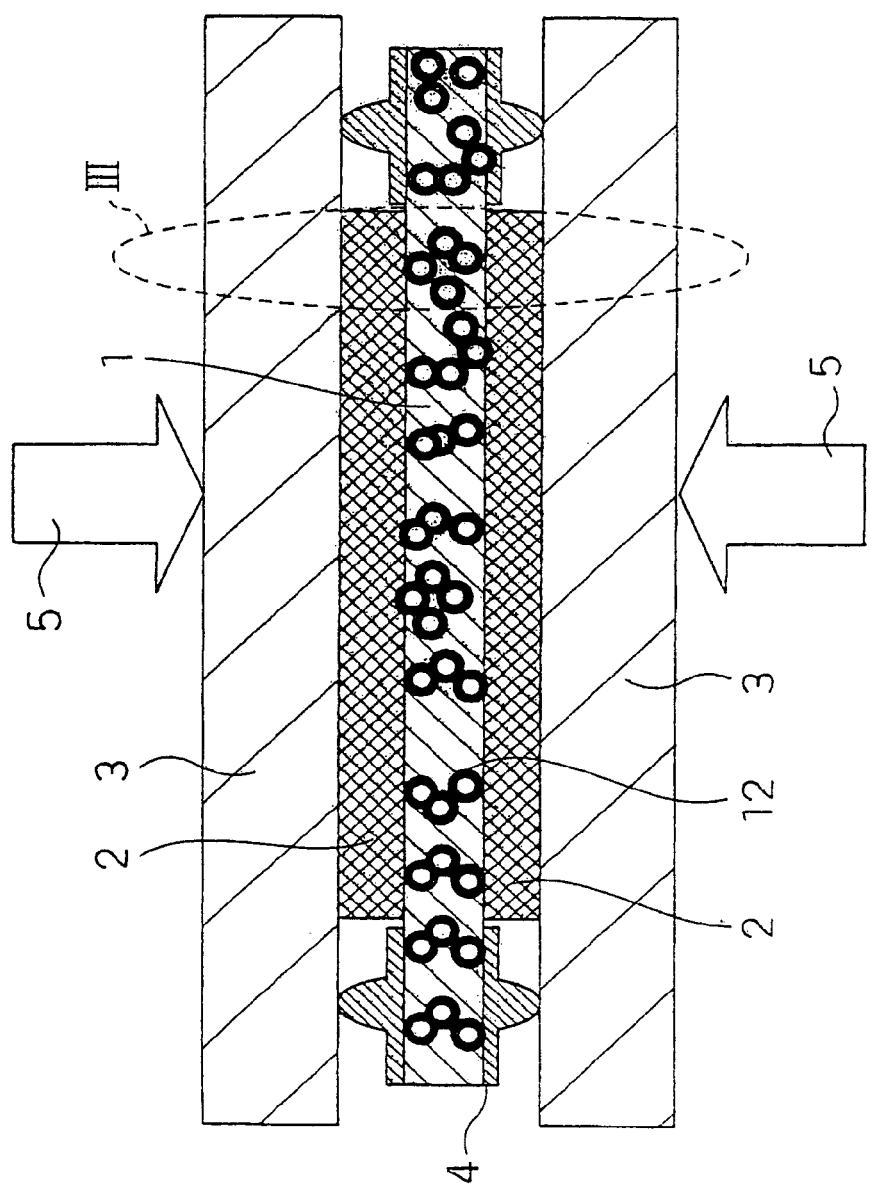
FIG. 2 is a schematic longitudinal sectional view illustrating a configuration of a membrane electrode assembly for a solid polymer electrolyte type fuel cell according to a variation of the first embodiment of the invention.
Figure 3:
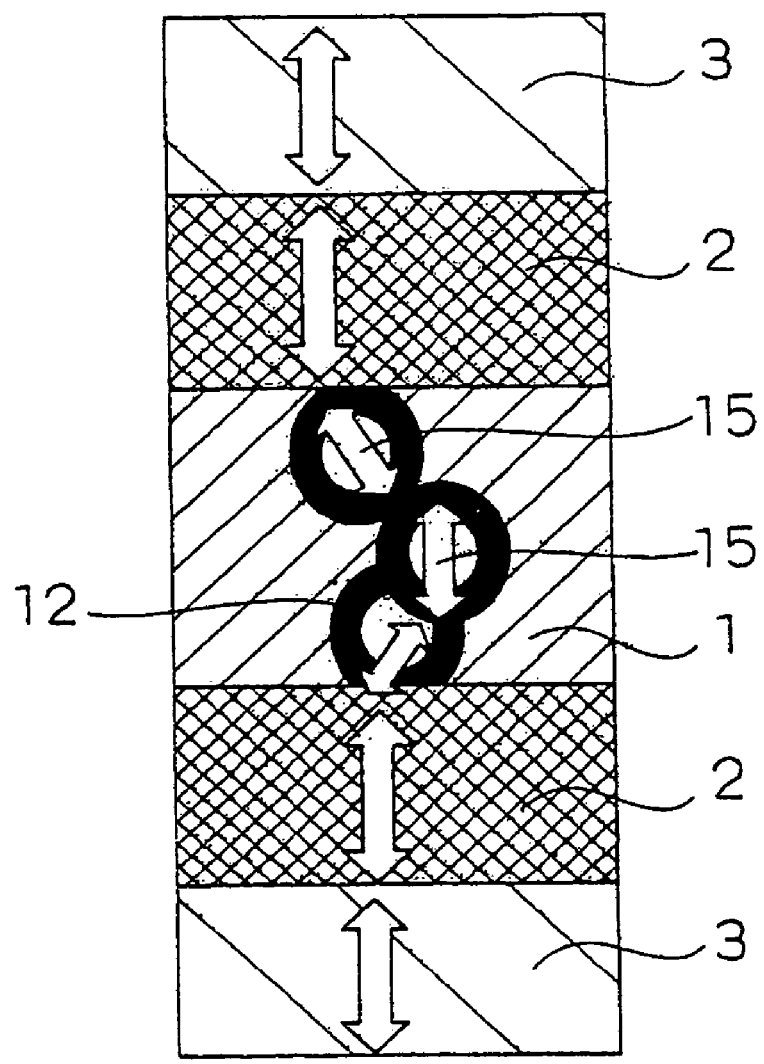
FIG. 3 is an enlarged diagram of portion III of FIG. 2.

FIG. 2 is a schematic longitudinal sectional view illustrating a configuration of a MEA for a solid polymer electrolyte type fuel cell according to a second embodiment of the invention In FIG. 2, beads 12 like beads 11 of FIG. 1 have a high creep resistance and are incorporated in electrolyte membrane 1. Beads 12 come in contact with each other to form a supporting force 15 against the clamping force 5 applied to electrolyte membrane 1, as shown in FIG. 3. FIG. 3 is an enlarged view of portion III of FIG. 2.

Figure 4:
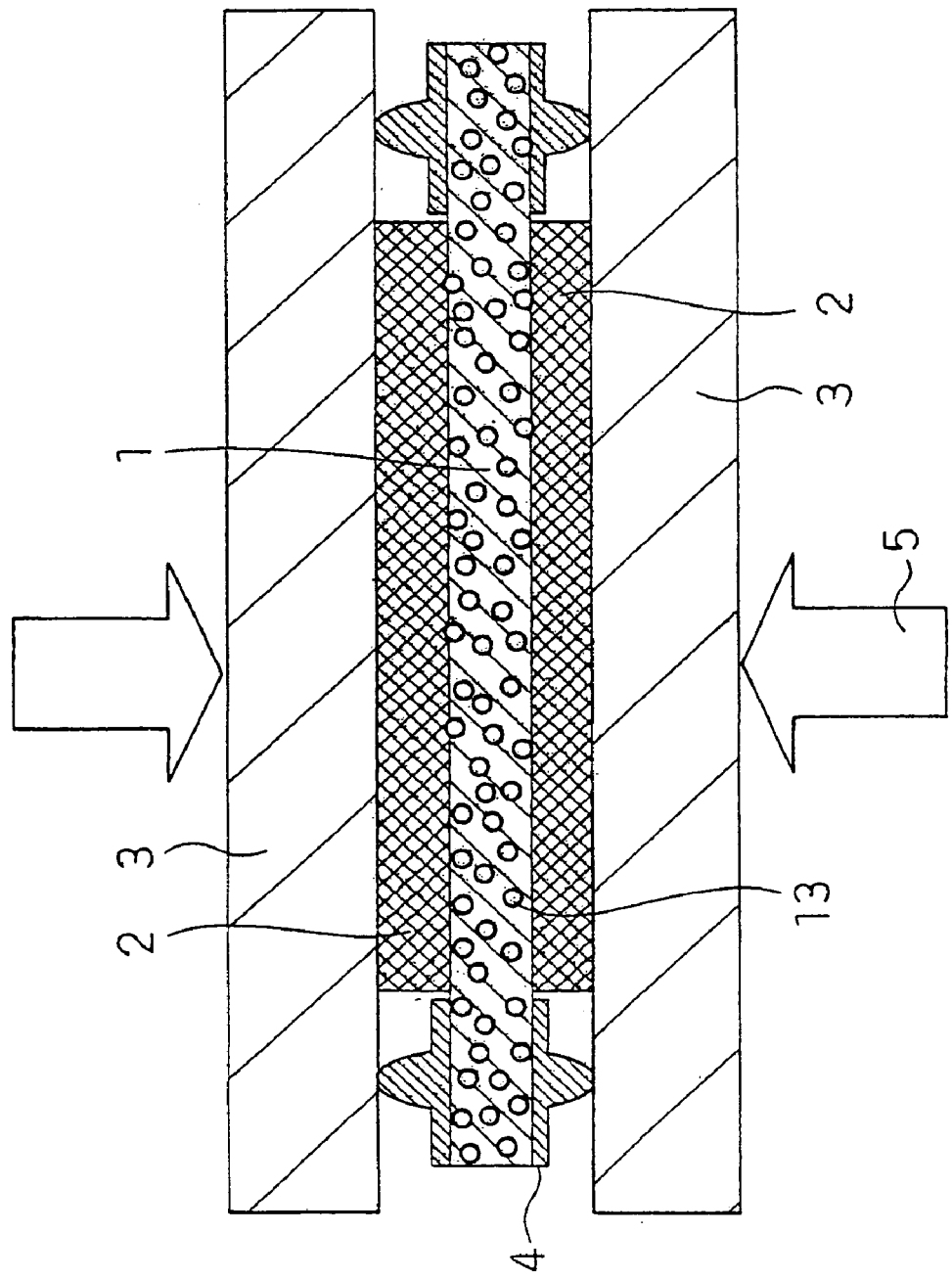
FIG. 4 is a longitudinal sectional view illustrating a configuration of a membrane electrode assembly for a solid polymer electrolyte type fuel cell according to another variation of the first embodiment of the invention.

FIG. 4 is a longitudinal sectional view illustrating a configuration of MEA for a solid polymer electrolyte type fuel cell according to a third embodiment of the invention.

In FIG. 4, even though beads 13 incorporated in the electrolyte membrane 1 may not or do not come in direct contact with each other, the creep resistance of the mixed material is enhanced.

Figure 11:
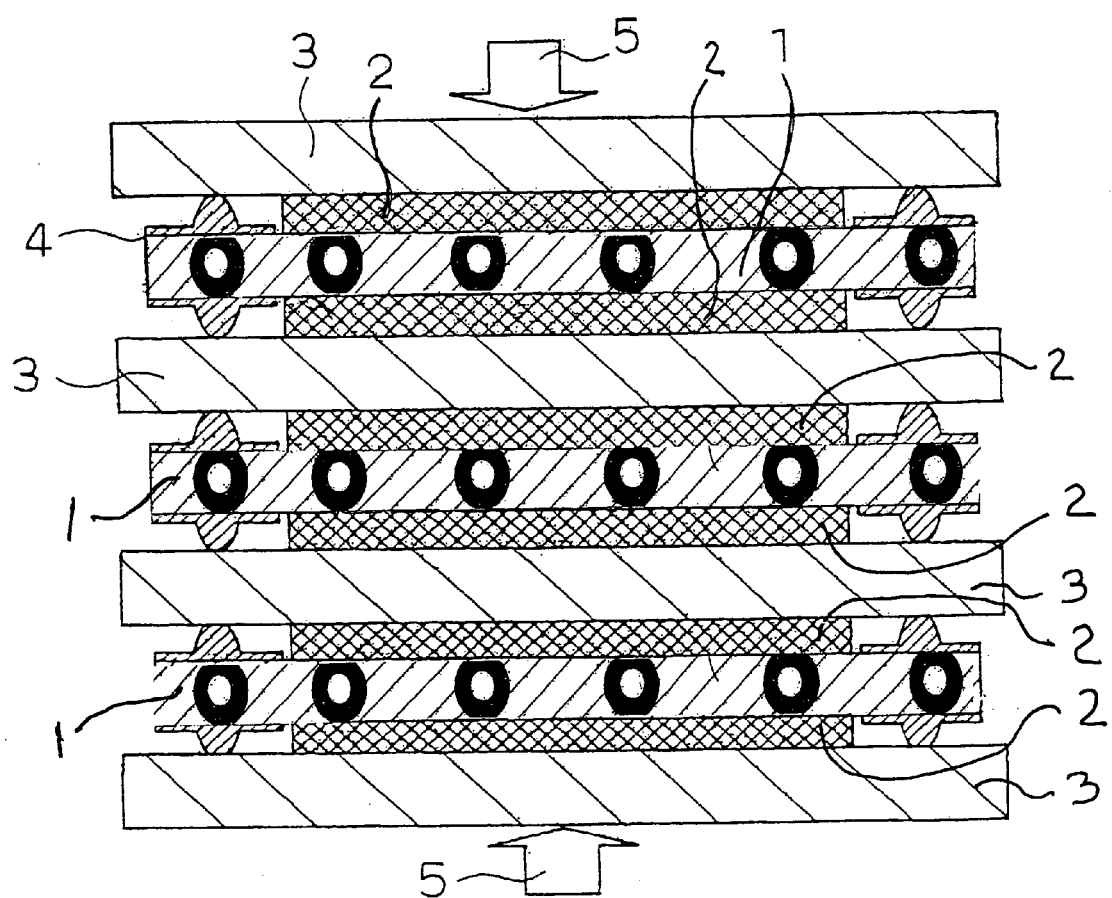
FIG. 11 shows a fuel cell stack incorporating a membrane electrode assembly according to the first embodiment of the present invention.

FIG. 11 shows a solid polymer electrolyte type fuel cell stack including multiple MEAs of the type illustrated by any of FIGS. 1, 2, and 4. This stack comprises cells formed of a polymer electrolyte membrane 1, which allow the selective transportation of a hydrogen ion upon the application of an electric field, and gas diffusion electrodes (including a catalyst layer) 2 formed on the respective sides of electrolyte membrane 1.

Figure 9:
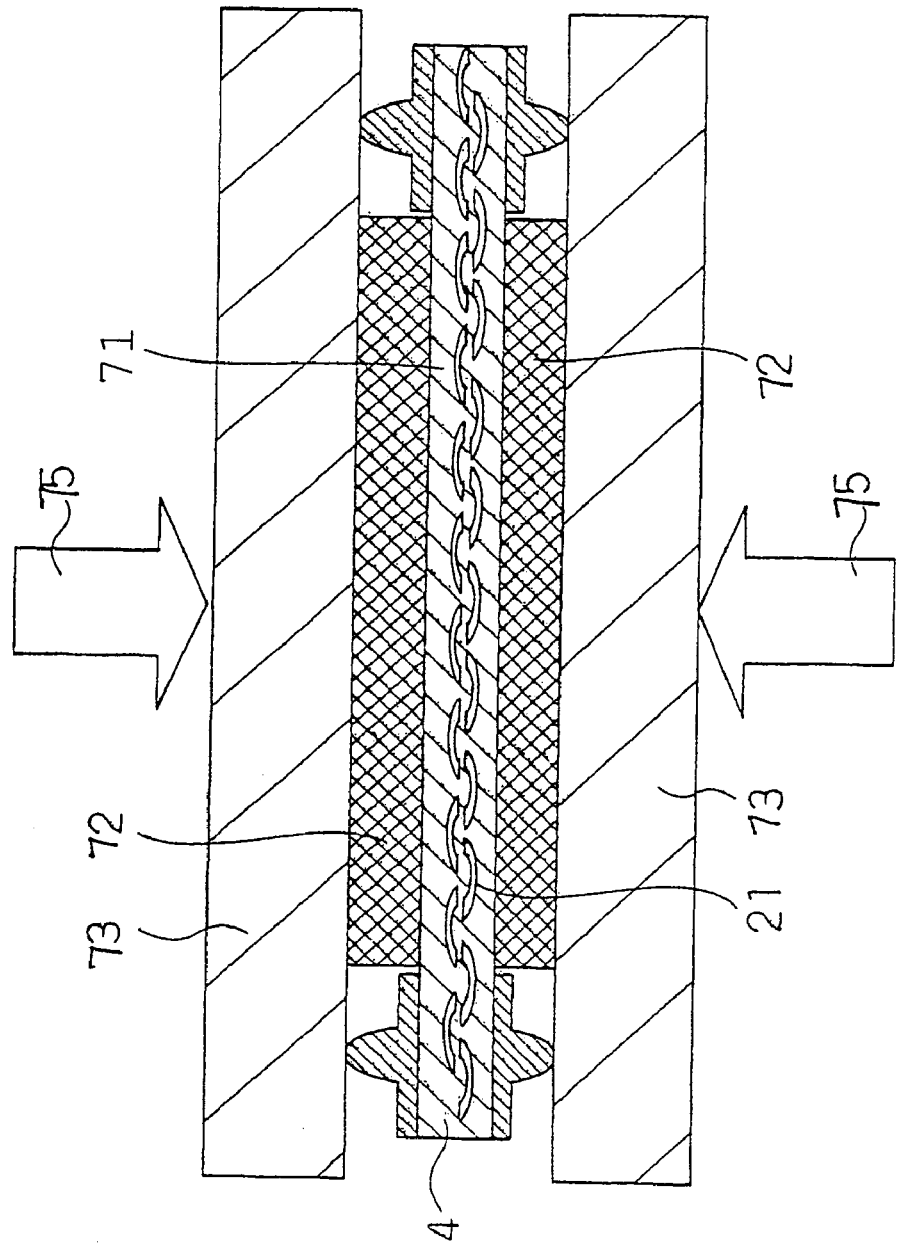
FIG. 9 is a longitudinal sectional view illustrating a first reinforcing structure for MEA for the related art polymer electrolyte type fuel cell.
Figure 10:
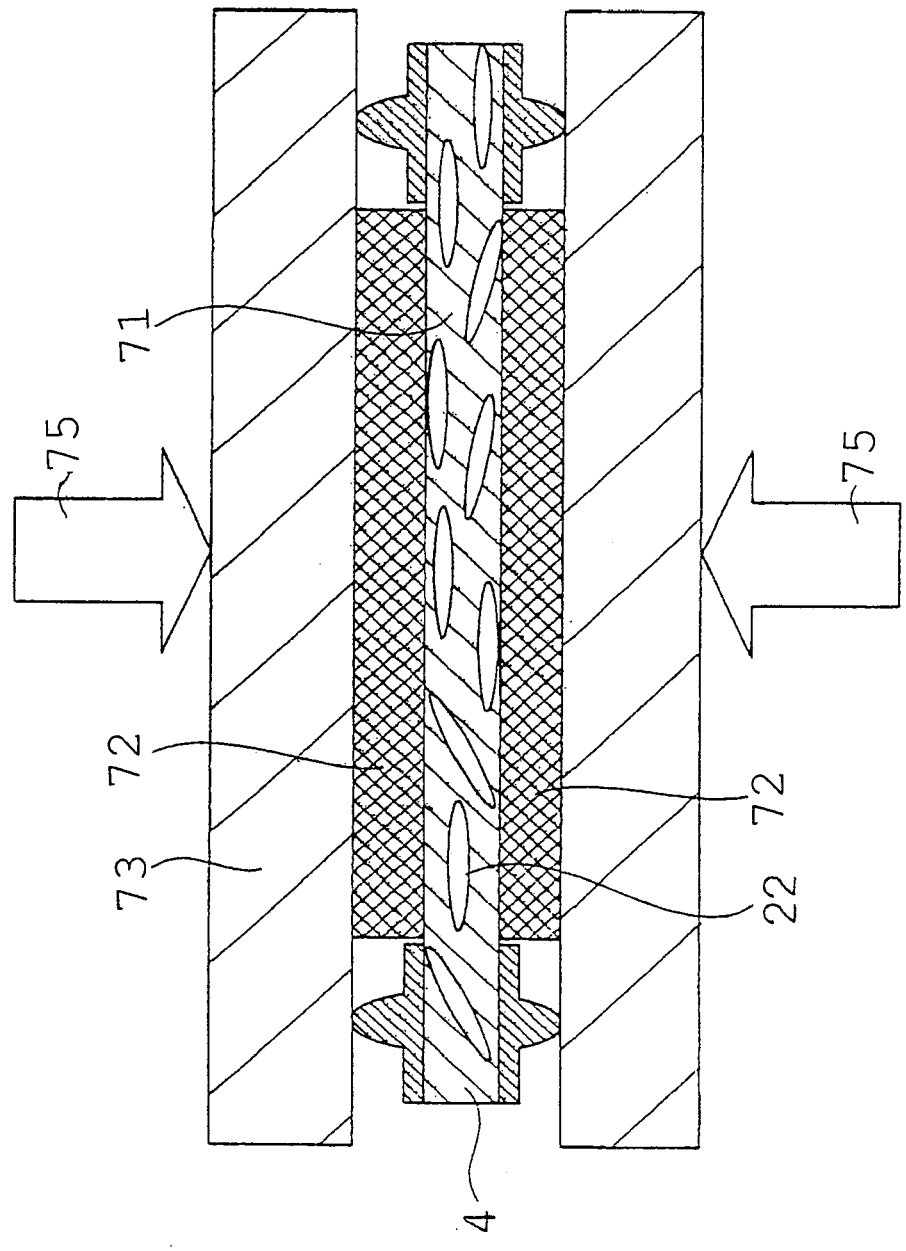
FIG. 10 is a longitudinal sectional view illustrating a second reinforcing structure for MEA for the related art polymer electrolyte type fuel cell.

Related art FIG. 9 illustrates an electrolyte material provided with pores 21, and FIG. 10 shows an electrolyte material provided with a porous material having fibers 22. Pores 21 and fibers 21 have a reinforcing capacity for preventing the break of polymer electrolyte membrane 1. Pores 21 and fibers 22 prevent the break of portions at which a shearing force or tension acts on polymer electrolyte membrane 1, such as at the edge of gas diffusion electrode 2. Accordingly, in this related art, it is important that pores 21 are formed continuously in the direction along the surface of the electrolyte membrane as shown in FIG. 9, or the fibers 22 are formed overlapping each other as shown in FIG. 10.

By contrast to pores 21 and fibers 22, beads 11, 12 and 13 of the first, second and third embodiments are preferably formed continuously or in overlapping arrangement with each other in the direction perpendicular to the surface of electrolyte membrane. The material for pores 21 and fibers 22 incorporated in electrolyte membrane 1 is selected for its tensile strength or shear strength, whereas compressive strength or creep resistance is important for the beads of the illustrative embodiments of the present invention.

In the embodiments of the present invention, gas diffusion electrode 2 may be referred to as an "electrode," polymer electrolyte membrane 1 may be referred to as an "electrolyte membrane," and beads 11, 12 and 13 each may be referred to as an "insert member." It is noted that the term "electrodes" encompasses the electrode with catalyst supported thereon. The fuel cell of the invention and the process for the production thereof will be further described hereinafter in connection with the attached drawings and the following examples.

EXAMPLE 1

With respect to carbon powders for the cathode and anode, Ketjen Black EC® (produced by AKZO Chemie, Inc., of Holland), supporting 50% by weight (wt-%) particular platinum, having an average particle diameter of about 30 angstroms, was used as the particle-supported catalyst for the cathode. Ketjen Black EC® is a particulate electrically-conductive carbon having an average primary particle diameter of 30 nm. On the other hand, Ketjen Black EC® having particulate platinum and particulate ruthenium supported thereon in an amount of 25% by weight, respectively, was used as the particle-supported catalyst for the anode. The particulate platinum and particulate ruthenium used for the anode each had an average particle diameter of about 30 angstroms.

The carbon powders for the cathode and anode were each dispersed in separate alcohol solutions of a polymer electrolyte to make a slurry. The alcohol solution of polymer electrolyte was obtained by dispersing 16 wt-% perfluorocarbonsulfonic acid in ethyl alcohol (Flemion®, produced by Asahi Glass Company). To obtain a 16 wt-% high concentration solution of the polymer electrolyte, a solution comprising water containing 10 wt-% of a polymer electrolyte and ethyl alcohol as a mixed solvent was concentrated by vacuum suction or the like.

Carbon papers were selected for use as diffusion electrodes 2. Each carbon paper, having a thickness of 400 μm, was dipped in an aqueous dispersion of fluororesin (Neoflon ND1®, produced by Daikin Industries, Ltd.), dried, and then subjected to heat treatment at 400° C. for 30 minutes to render it water-repellent. Subsequently, the slurry containing the carbon powder for the cathode was uniformly spread over one side of a first one of the water-repellent carbon papers to form a catalyst layer thereon. Similarly, the slurry containing the carbon powder for the anode was uniformly spread over one side of the second one of the water-repellent carbon papers to form a catalyst layer thereon. The thickness of the layers spread on the carbon papers may be about 30mm. Thus, a gas diffusion electrode 2 for the cathode and a gas diffusion electrode 2 for the anode were prepared. The surface area of each electrode was 6 cm×6 cm. The thickness of each electrode may be about 460 mm.

Polymer electrolyte membrane 1 was obtained by cast-molding a polymer electrolyte solution into a sheet, drying the sheet, and then subjecting the sheet to heat treatment. More specifically, a third 16 wt-% high concentration alcohol solution of polymer electrolyte was mixed with polytetrafluoroethylene (PTFE) approximately spherical beads, having an average particle diameter of 30 μm, in an amount of 2 wt-% based on the total weight of the solution. The mixture was then stirred thoroughly. The PTFE bead-incorporated electrolyte solution was spread over a polyethylene terephthalate (PET) film coated with a fluorine-based release agent using a bar coater, and then dried. By adjusting the amount of spreading of the PTFE bead-incorporated electrolyte solution or the concentration of the fluorine-based release agent coating solution, the thickness of the polymer electrolyte membrane after being dried was adjusted to 50 μm±5 μm. Electrolyte membrane 1 was cut into a size of 12 cm square, which was then subjected to heat treatment at a temperature of 130° C. for 30 to 60 minutes in a heat treatment device filled with nitrogen gas.

The two sheets of carbon paper forming the cathode and anode, each having a catalyst layer formed thereon (provided by the slurry containing the carbon powder), were laminated with the solid polymer electrolyte membrane 1, such that the solid polymer electrolyte membrane 1 was interposed between the two sheets of carbon paper and the catalyst layer side of each of the sheets of carbon paper wer disposed opposed to the other. In order to prevent the supplied gases from leaking or being mixed with each other, a sheet (gasket) made of silicone rubber having a thickness of about 350 μm was provided as a gas seal on the periphery of the electrode. The laminate was then hot-pressed at a temperature of 100° C. for 5 minutes to obtain the MEA.

Two sheets of carbon separator, each comprising a sintered carbon plate having a gas channel cut on its surface, were arranged such that the gas channels were opposed to the respective electrode. The laminate was then clamped with a clamping pressure of 5 kgwt/cm$^2$ applied thereto by stainless steel end plates.

The fuel cell thus produced was then subjected to an evaluation test using pure hydrogen and air as the reactive gases. The evaluation test was performed for a standard condition I and an accelerated condition II. Accelerated condition II was designed to accelerate the creep in the electrolyte and the catalyst layer.

For standard condition I, the temperature of the cell was 75° C., the dew point of the pure hydrogen gas supplied to the anode was 70° C., the dew point of air supplied to the cathode was 70° C., the percentage utilization of hydrogen was 75%, the percentage utilization of air was 40%, and the current density was 0.2 A/cm$^2$. Accelerated condition II used the same conditions as those for standard condition I except the temperature of the cell was 85° C., the dew point of hydrogen was 85° C., and the dew point of air was 85° C.

A related art MEA having no second material, such as PTFE beads, incorporated in the electrolyte membrane was subjected to the same evaluation test under both conditions. This related art MEA serves as a control reference.

Ten cells (N=10) were tested for each of four distinct durability tests within the evaluation test. The cell evaluation test was conducted for 2,000 hours. The evaluation test results for both the MEA produced in accordance with the description in Example 1 and the related art MEA are set forth in Table 1.

TABLE 1

|  | Standard Condition I | | Accelerated Condition II | |
| --- | --- | --- | --- | --- |
|  | Number of fuel cells untestable after 2000 hours (from a total of 10 cells) | Deterioration rate (after 2,000 hours) | Number of fuel cells untestable after 2000 hours (from a total of 10 cells) | Deterioration rate (after 2,000 hours) |
| Fuel cell produced according to Example 1 | 0 | 0–2 mV/1000 h | 1 | 4 mV/1000 h |
| Related art fuel cell | 3 | 10 mV/1000 h | 5 | 80 mV/1000 h |

During the evaluation test, some of the cells showed a sudden deterioration of performance (i.e., cell destruction) that prevented the continuance of the durability test for these cells (that is, these cells became untestable). Even the cells that could continue the durability test showed a great difference in deterioration rate depending on the configuration of the MEA or testing conditions.

As can be seen in the results set forth in Table 1, the MEA produced according to Example 1 is less likely to suffer cell destruction, as compared with the related art MEA. The cells comprising the related art MEA, which had suffered destruction, showed cross-leakage of hydrogen gas by as much as about ten times the rate of that of the cells which had not suffered destruction. Also, the cells that had undergone destruction showed a DC resistance drop of about half that of those which had undergone no destruction, demonstrating that it is likely that the creep of the electrolyte membrane caused the short-circuiting of the two electrodes.

Furthermore, a comparison of the test results for standard condition I and accelerated condition II shows the probability of cell destruction is higher under accelerated condition II than under standard condition I. Accordingly, these results suggest that cell destruction is caused by the creep of the electrolyte membrane, since the creep resistance of the electrolyte membrane deteriorates under high temperature and high relative humidity conditions.

Thus, an MEA having an improved membrane creep resistance, such as the MEA of Example 1, inhibits cell destruction during continuous operation. Also, the deterioration rate for the MEA of Example 1 is much lower than that of the MEA of the related art. Therefore, the MEA of Example 1 inhibits the deterioration of performance arising from the increase of contact resistance, which is due to stress relaxation.

EXAMPLE 2

In this example, the particle diameter and mixing proportion of approximately spherical beads incorporated in the electrolyte membrane were studied.

Beads of hard glass having different particle diameters were prepared. For the preparation of beads having a particle diameter of not greater than 20 μm, hard glass was ground by a ball mill to adjust the average particle diameter of the beads. MEAs comprising glass beads having different particle diameters incorporated in polymer electrolyte membrane 1 were then subjected to a cell durability test in the same manner as in Example 1.

The cell durability test showed that when the particle diameter of the beads incorporated in electrolyte membrane 1 is 5 μm or less, the ability of the MEA to inhibit cell destruction or deterioration is low. On the other hand, when the particle diameter of the beads is too great, the resulting membrane solution cannot be cast onto a PET substrate to form a film thereon or the resulting electrolyte membrane itself exhibits a disadvantageous reduced mechanical strength. Therefore, the particle diameter of the beads to be incorporated in the electrolyte membrane preferably ranges from greater than 5 μm to the thickness of the electrolyte membrane itself. The upper limit of the thickness range is substantially equal to the thickness of the electrolyte membrane itself, i.e., about 30 mm in a typical example.

The mixing proportion of the beads was also studied. When a 16 wt-% solution of polymer electrolyte (Flemion® produced by ASAHI GLASS COMPANY) having 2 wt-% PTFE beads incorporated therein is cast to form a film, PTFE beads account for about 10% of the volume of the polymer electrolyte, depending on the hydrous state of the polymer electrolyte membrane. PTFE beads having an average particle diameter of 30 μm were incorporated in a polymer electrolyte solution in amounts of 0.3%, 1%, 3%, 10%, 30%, 50% and 70% by volume, respectively. Then, the polymer electrolyte solutions were each cast to form a film in the same manner as in Example 1.

The MEAs produced from these different proportions of polymer electrolyte solution and PTFE beads were each subjected to a cell evaluation durability test in the same manner as in Example 1. Based on this testing, it was confirmed that the cells comprising MEAs having PTFE beads incorporated therein in an amount of not less than 1% by volume have an advantage. In other words, the cells whose membranes have beads incorporated therein in an amount not less than 1% by volume undergo destruction less frequently or show a lower deterioration rate than cells of the related art MEAs. Further, the results showed that polymer electrolyte solutions having beads incorporated therein in an amount greater than 50% by volume can be difficult to cast in forming a film.

This experiment was conducted with PTFE beads. However, glass beads or the like may be incorporated in an amount as much as twice to three times the amount of PTFE beads because of their difference in specific gravity. The mixing proportion of materials which has an effect on the cell durability is probably affected greatly by the specific gravity, shape, particle diameter (powder diameter), creep resistance, etc. of the materials incorporated. Also, the mixing proportion of materials depends greatly on the sealing structure or clamping structure of the cell stack. The proportion of materials used in the MEA should account for the mechanism causing cell destruction or the mechanism of performance deterioration caused by the increase of contact resistance, resulting from the drop of contact pressure.

EXAMPLE 3

In this example, the materials to be incorporated in electrolyte membrane 1 were studied for their ability to inhibit the deterioration of performance caused by the creep or stress relaxation of electrolyte membrane 1.

The perfluorocarbonsulfonic acid, PTFE, and polyvinyl-based resin as used in the electrolyte material in Example 1 were each cut into a strip having a thickness of 200 μm, a width of 10 mm and a length of 50 mm. Each specimen strip was then measured for creep properties according to the method shown in FIG. 5.

Figure 5:
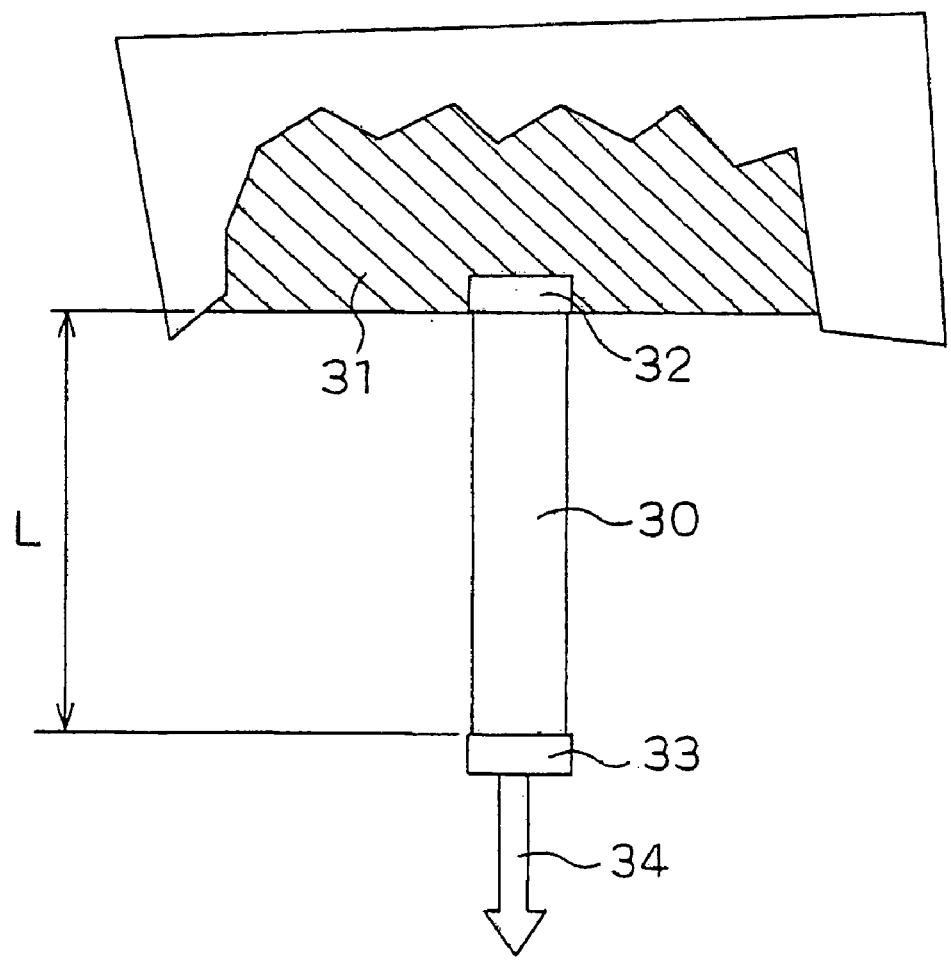
FIG. 5 is a schematic diagram illustrating a device used in the evaluation of the creep resistance of the materials to be incorporated in the electrolyte membrane.
Figure 7:
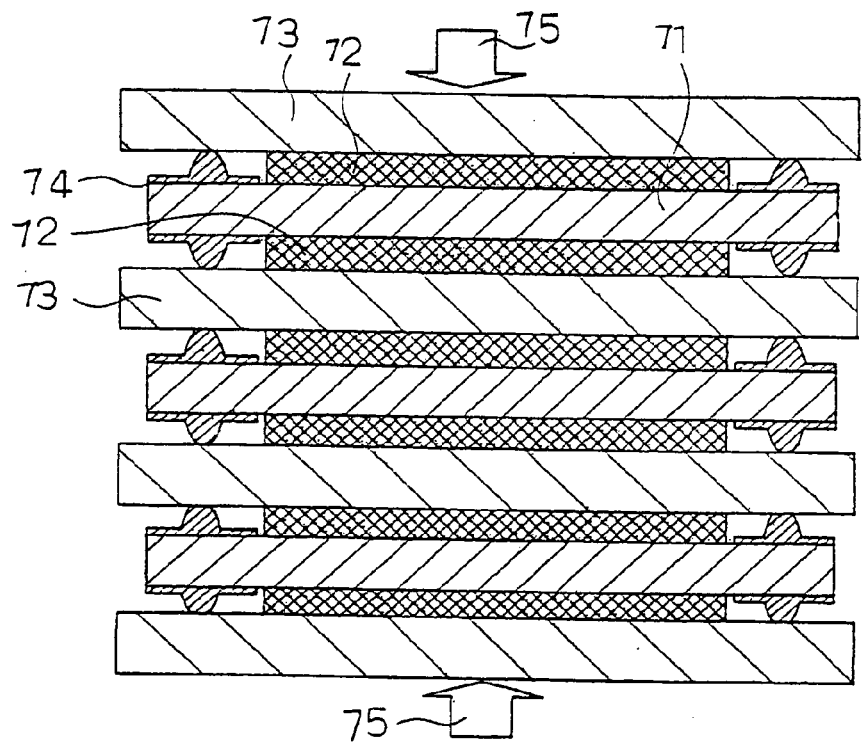
FIG. 7 is a longitudinal sectional view illustrating a related art polymer electrolyte type fuel cell stack.
Figure 8:
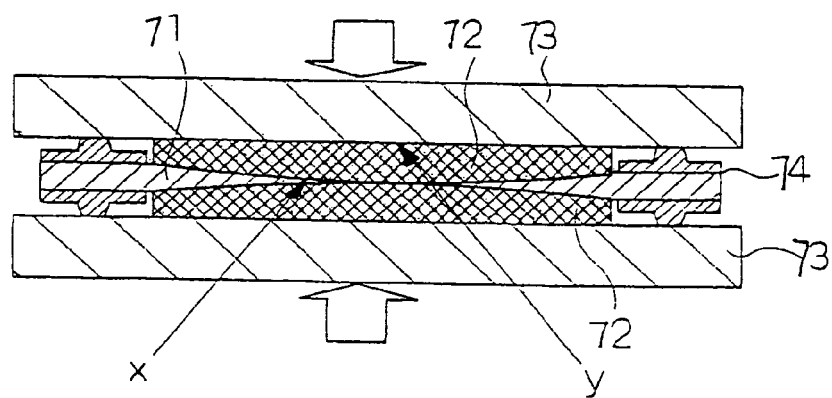
FIG. 8 is a longitudinal sectional view illustrating a related art polymer electrolyte type fuel cell after a prolonged operation.

FIG. 5 illustrates a device used in the evaluation of the creep resistance of the materials to be incorporated in the electrolyte membrane. The device is arranged such that a tensile load 34 is applied to a specimen 30 fixed at an upper chuck 32, mounted on a base 31, and a lower chuck 33.

A predetermined tensile load 34 (100 to 500 gwt) was applied to the three specimens at both ends. Elapsed time and the length L of the specimen were measured. During the measurement, the atmosphere was kept at a relative humidity of 50% so that moisture conditioning was kept constant.

As can be seen in FIGS. 6(a) to 6(c), all the specimens show an instantaneous deformation with the application of a tensile load, but then gradually stretch with time. FIG. 6(a) illustrates the creep resistance of a polyvinyl-based resin material to be incorporated in electrolyte membrane 1. FIG. 6(b) illustrates the creep resistance of a perfluorocarbonsulfonic acid material to be incorporated in electrolyte membrane 1. FIG. 6(c) illustrates the creep resistance of a PTFE material to be incorporated in electrolyte membrane 1.

As opposed to the instantaneous deformation that occurs shortly after pulling (elastic deformation), the elongation developed over a predetermined period of time, such as 1 to 5 hours following the application of a tensile load, is defined as creep deformation.

Among the specimens of perfluorocarbonsulfonic acid, PTFE, and polyvinyl-based resin used in the experiment, the polyvinyl-based resin specimen showed the greatest creep deformation. The perfluorocarbonsulfonic acid specimen showed the second greatest creep deformation, and the PTFE specimen showed the smallest creep deformation.

The smaller the creep deformation is, the greater is the creep resistance. Therefore, PTFE showed the greatest creep resistance of the three specimens.

The polyvinyl-based resin was incorporated in an electrolyte membrane in the form of beads, having an average particle diameter of 30 μm, in the same manner as described in Examples 1 and 2 for producing an MEA. However, the MEA having this polyvinyl-based resin incorporated therein did not provide a reduced probability of cell destruction or a reduced deterioration rate, which causes sudden cell destruction. Furthermore, the MEA showed a greater frequency of occurrence of cell destruction as compared with the related art MEA. This is believed to be because the incorporation of the polyvinyl-based resin, which has a smaller creep resistance than the electrolyte membrane, in the electrolyte membrane causes the reduction of the creep resistance of the MEA or the electrolyte membrane itself.

In the present example, a tensile deformation test as shown in FIG. 5 was conducted to make a comparison of creep resistance. In operation, the load applied to an MEA is a compressive force that is applied across the membrane. However, a material having a high tensile creep resistance also exhibits a high creep resistance during compression.

Besides the aforementioned PTFE and polyvinyl-based resin, copper, aluminum, titanium, zirconia, aluminum nitride, SiC and quartz glass were each incorporated in the electrolyte membrane comprising perfluorocarbonsulfonic acid, as used in Example 1, to produce an MEA which was then subjected to experiment. As a result, it was confirmed that the incorporation of any of these materials makes it possible to improve the durability of the cell against cell destruction.

However, the MEAs produced with copper, aluminum and SiC had a greater deterioration rate than the related art MEA. Using copper, aluminum, or SiC in the MEA reduces the deterioration of cell performance caused by the creep of the electrolyte, but the release of contaminants, such as metal ions, accelerates the deterioration of cell performance.

EXAMPLE 4

Perfluorocarbonsulfonic acid, which is a main material of the electrolyte, was also studied as a candidate of materials having a higher creep resistance. A perfluorocarbonsulfonic acid having an EW value of 900 was used in a manner similar to that described for the production of the MEAs in Examples 1 to 3. EW value is a parameter for the concentration of ion exchange group (such as sulfone group). The greater the EW value, the smaller is the concentration of ion exchange group and the more difficulty is encountered with plastic deformation. As a result of the measurement of creep resistance, according to the method shown in FIG. 5, it was confirmed that the greater the EW value, the higher is the creep resistance.

An electrolyte solution (16 wt-%) having an EW value of 1,100 was sprayed into dried nitrogen (about 110° C.) to produce perfluorocarbonsulfonic acid powders having various particle diameters. These perfluorocarbonsulfonic acid powders were each then subjected to heat treatment at a temperature of from 120° C. to 130° C. for about 30 minutes to enhance their difficulty of dissolution in solvent. These powders were each then cast to form a film in the same manner as in Example 1.

The cells comprising these membranes were confirmed to exhibit improved durability. These cells have EW values as high as 1,100 and a slightly reduced ionic conductivity, but maintain a higher total ionic conductivity than those comprising membranes having PTFE or hard glass incorporated therein. The breakage resistance at sites where shearing stress or tensile stress is applied to the electrolyte membrane is also improved because these cells comprise the same perfluorocarbonsulfonic acid, and the perfluorocarbonsulfonic acid particles thus incorporated have good bonding properties with the materials constituting the electrolyte.

Thus, the structure of the main chain moiety of the macromolecular material that is incorporated may be the same as that of the material constituting the electrolyte membrane. However, the properties of matter (e.g. EW value, the glass transition temperature or the like), particularly the dynamic properties of the macromolecular material incorporated, are preferably different from those of the material constituting the electrolyte membrane.

EXAMPLE 5

In this example, the form of incorporation of materials having an excellent creep resistance was studied.

The method of reinforcing the related art MEA, particularly electrolyte membrane 1, is a method of enhancing the tensile strength of the material using a porous material of PTFE having pores 21 or fiber 22 as a core material as shown in FIGS. 9 and 10. In order to confirm the difference between the related art electrolyte membrane and MEA comprising such a reinforcing core material and the embodiments of the present invention, the following experiment was conducted.

In constructing a related art type MEA, PTFE beads having an average particle diameter of 10 μm were incorporated in the electrolyte solution in an amount such that the weight proportion thereof was equal to that of the electrolyte after drying. The mixture was then used to form a sheet having a thickness of 20 μm. Subsequently, the electrolyte solution was batch-wise cast onto the sheet thus formed to produce an electrolyte membrane having a total thickness of 50 μm. This electrolyte membrane was used to produce an MEA that was then observed on its section under a microscope. The results are shown in FIG. 9.

A cell incorporating this MEA was then subjected to a durability evaluation test in the same manner as described in Example 1. During this test, the related art MEA exhibited a great deterioration rate and a great probability of occurrence of cell destruction as compared with the MEAs having the sectional configurations shown in FIGS. 1, 2 and 4.

An MEA having a sectional configuration as shown in FIG. 9 cannot provide improved durability, as in the embodiments of the present invention. This is believed to be because the MEA of FIG. 9 provides no improvement of creep resistance in the direction of compression of electrolyte membrane 1. For the same reason, the MEAs shown in related art FIGS. 9 and 10 also cannot provide improved durability.

An electrolyte membrane comprising PTFE beads having an average particle diameter of 10 μm incorporated therein in an amount of 1 wt-% was then subjected to durability evaluation test in the form of cell.

In a section of the electrolyte membrane having a relatively small amount of PTFE beads incorporated therein, the particles incorporated in the electrolyte membrane do not necessarily come in direct contact with each other to support the load applied across the membrane, as shown in FIG. 4. However, it was confirmed in a durability evaluation test of a cell that these cells have an improved durability. The incorporation of such a foreign material causes the enhancement of threshold stress against the plastic deformation of the membrane even if the membrane is, or foreign material particles are, not arranged to directly support the compressive load. The enhancement of threshold stress against the plastic deformation of the membrane results in the enhancement of durability.

EXAMPLE 6

Example 5 involves the use of a perfluorocarbonsulfonic acid as an electrolyte membrane. Even if other hydrocarbon-based membranes are used, the introduction of the configuration of the embodiments of the present invention makes it possible to improve the durability of such membranes.

In the herein-described embodiments of the present invention and in Examples 1–5, it has been described that "beads" are used as materials, having a high creep resistance, to be incorporated in the electrolyte membrane. However, the materials to be incorporated in the electrolyte membrane need not be in the form of a sphere or grain. Any geometric shape and any texture may be used. In the case of the configuration shown in FIG. 4, flat particles or particles having much surface roughness provide an improved creep resistance for the electrolyte membrane. A durability comparison of an electrolyte membrane comprising a leaf glass powder, obtained by crushing hard glass, with the electrolyte membrane comprising particles obtained by the use of a ball mill in Example 2, showed that the electrolyte membrane having a fine leaf glass powder incorporated therein exhibits a high durability. The durability test conditions employed here were similar to those described for the evaluation testing discussed in Example 1.

Furthermore, the configuration as used in the phosphoric acid type fuel cell and molten carbonate type fuel cell, which has a continuous presence of a polymer electrolyte in the voids of the structural material (porous material, etc.), having a high creep resistance, to secure a desired hydrogen ionic conductivity between the two electrodes, is desirable for the enhancement of durability.

In the aforementioned description, Examples 1 to 6 of the invention have been described in detail. The foregoing description illustrates and describes the present invention.

However, the disclosure shows and describes only various embodiments of the invention, but it is to be understood that the invention is capable of use in various other combinations, modifications, and environments. Also, the invention is capable of change or modification, within the scope of the inventive concept, as expressed herein, that is commensurate with the above teachings and the skill or knowledge of one skilled in the relevant art.

The embodiments described herein are further intended to explain best modes known of practicing the invention and to enable others skilled in the art to incorporate the invention in these and other embodiments, with the various modifications that may be required by the particular applications or uses of the invention. Accordingly, the description is not intended to limit the invention to the form disclosed herein.

Advantages of the Invention

As mentioned above, the creep resistance of the entire electrolyte membrane can be enhanced while maintaining the desired hydrogen ionic conductivity. In this arrangement, the mixing of reactive gases on the anode side and cathode side or minute short-circuiting of the two electrodes due to plastic deformation of the electrolyte membrane can be prevented, making it possible to provide a polymer electrolyte membrane type fuel cell which can operate stably over an extended period of time. The embodiments of the present invention are advantageous in that the performance deterioration or destruction of the fuel cell caused by creep or stress relaxation in the electrolyte can be inhibited.

What is claimed is:

1. A fuel cell component comprising:

an electrolyte membrane; and a plurality of insert members disposed in the electrolyte membrane that provide resistance to creep in the electrolyte membrane that would otherwise result from a compression force applied substantially perpendicular to a surface of said electrolyte membrane, wherein:

the plurality of insert members comprise PTFE and have an average outer dimension that is greater than 5 μm and no greater than a thickness of the electrolyte membrane.

2. A fuel cell component comprising:

an electrolyte membrane; and a plurality of insert members disposed in the electrolyte membrane that provide resistance to creep in the electrolyte membrane that would otherwise result from a compression force applied substantially perpendicular to a surface of said electrolyte membrane, wherein:

the electrolyte membrane is produced from a polymer electrolyte solution having an EW value in the range of 900 to 1100, and the EW value of the electrolyte membrane is substantially the same as the EW value of the insert member.

3. A fuel cell component comprising:

an electrolyte membrane; and a plurality of insert members disposed in the electrolyte membrane that provide resistance to creep in the electrolyte membrane that would otherwise result from a compression force applied substantially perpendicular to a surface of said electrolyte membrane, wherein:

the plurality of insert members comprise PTFE, have an average outer dimension in the range of about 5 to 15 μm, and amount to not less than 1% by volume of the electrolyte membrane an insert members in combination.

4. A fuel cell component comprising:

an electrolyte membrane; and a plurality of insert members disposed in the electrolyte membrane that provide resistance to creep in the electrolyte membrane that would otherwise result from a compression force applied substantially perpendicular to a surface of said electrolyte membrane, wherein:

the plurality of insert members comprising a fine leaf glass powder.

5. A fuel cell stack comprising:

first and second end plate assemblies;

a fuel cell assembly interposed between said first and second end plate assemblies and comprising fuel cell components each comprising an electrolyte membrane and a plurality of insert members disposed in the electrolyte membrane that provide resistance to creep in the electrolyte membrane that would otherwise result from a compression force applied substantially perpendicular to a surface of said electrolyte membrane and electrodes disposed on each side of said electrolyte membrane, said fuel cell components being laminated with a plurality of separators; and a compression assembly that clamps said first and second end plate assemblies and said fuel cell assembly together to provide said compression force, wherein:

the insert members comprise a material made of a polymer compound whose structure of the main chain moiety is the same as that of a material of the electrolyte membrane, and said insert members are granular members.

* * * * *

UNITED STATES PATENT AND TRADEMARK OFFICE
CERTIFICATE OF CORRECTION

PATENT NO. : 7,172,829 B2
APPLICATION NO. : 10/681334
DATED : February 6, 2007
INVENTOR(S) : Gyoten et al.

Page 1 of 1

It is certified that error appears in the above-identified patent and that said Letters Patent is hereby corrected as shown below:

Claim 3, second to last line, change "an" to --and--.

Signed and Sealed this

Twenty-fourth Day of June, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,172,829 B2 | Page 1 of 1 |
| APPLICATION NO. | : 10/681334 | |
| DATED | : February 6, 2007 | |
| INVENTOR(S) | : Gyoten et al. | |

It is certified that error appears in the above-identified patent and that said Letters Patent is hereby corrected as shown below:

Column 16, Claim 3, line 14, change "an" to --and--.

This certificate supersedes the Certificate of Correction issued June 24, 2008.

Signed and Sealed this

Twenty-second Day of July, 2008

JON W. DUDAS
*Director of the United States Patent and Trademark Office*